United States Patent [19]

Blaskowski

[11] 4,176,623

[45] Dec. 4, 1979

[54] FLUIDIZED BED BOILER

[75] Inventor: Henry J. Blaskowski, West Simsbury, Conn.

[73] Assignee: Combustion Engineering, Inc., Windsor, Conn.

[21] Appl. No.: 884,651

[22] Filed: Mar. 8, 1978

[51] Int. Cl.² ............................ F23D 1/00; F22B 29/00
[52] U.S. Cl. .............................. 122/367 PF; 110/244; 110/263
[58] Field of Search ................ 110/244, 263, 265; 122/4 D, 367 PF

[56] References Cited

U.S. PATENT DOCUMENTS

| | | | |
|---|---|---|---|
| 2,082,338 | 6/1937 | Hays | 122/367 |
| 2,121,733 | 6/1938 | Cottrell | 122/4 |
| 2,835,483 | 5/1958 | Lindsay | 122/4 |
| 2,997,031 | 8/1961 | Ulmer | 122/4 |
| 3,877,441 | 4/1975 | Mach et al. | 122/367 |

*Primary Examiner*—Kenneth W. Sprague

[57] ABSTRACT

An individual cell of a fluidized bed includes a static bed disposed immediately below the fluidization region. The static bed contains heavy ores or other suitable dense material that can be heated to a temperature above the ignition temperature of the fuel used in the fluid bed. Should the fluidized-bed temperature fall below the ignition temperature of the fuel, the lower thermal conductivity of the static bed permits it to maintain the ignition temperature and to ignite the fuel until the fluidized bed has been rekindled.

5 Claims, 2 Drawing Figures

FLUIDIZED BED BOILER

BACKGROUND OF THE INVENTION

The need to turn to coal as a principal energy source has provided an impetus for examining various methods of burning the fuel in an environmentally acceptable manner. Among the methods in which interest has been rekindled is that of burning the coal in a fluidized bed. In a fluidized-bed arrangement, coal and air are reacted in a bed of particulate matter that is agitated by the flow of the air to the extent that it attains a quasi-liquid state. The advantages of this mode of burning coal lie in the ability of the bed to burn the coal in a comparatively small volume, to conduct heat relatively rapidly to heating surfaces placed in the bed, and to absorb the sulfur in the coal if the fluidized medium includes material that reacts with the oxidized sulfur.

The relatively rapid conduction of the heat to the heating surfaces results from the high thermal conductivity that characterizes the quasi-liquid mass of particles in the bed. Unfortunately, the high conductivity of the bed in the fluidized state makes stable operation at low firing rates difficult. A fluidized bed that liberates $1 \times 10^6$ Btu/Hr—and which therefore has associated with it heat-conduction surfaces that absorb heat at that rate—may only have $4 \times 10^4$ Btu associated with it at a temperature of 1500° F. (820° C.). Consequently, a small imbalance between the rate of heat liberation and the rate of heat removal can cause the bed temperature to fall by a relatively large amount. Such an imbalance, caused, for instance, by a momentary reduction in fuel-supply rate, can use the bed temperature to fall below the ignition temperature of the fuel, particularly when the average firing rate, and thus the bed temperature, is already relatively low. Since the ignition of fuel in a fluidized-bed boiler is dependent predominantly upon bed temperature, the almost unavoidable heat-flow imbalances in the system can cause the bed to be extinguished at low loads.

SUMMARY OF THE INVENTION

The present invention is therefore a method and apparatus for facilitating operation of a fluidized-bed furnace, particularly at low load.

A fluidized-bed cell according to the present invention comprises a combustion region with a static bed positioned in it, a fluidized bed positioned above and immediately adjacent to the static bed, and a means for feeding it with fuel particles. The static bed comprises inert heat-storage particles, and means are provided for blowing air up through the static bed into the combustion region in such a manner as to fluidize the fuel particles but not the heat-storage particles. Means are also provided for igniting the fuel particles supplied to the combustion region.

According to the preferred embodiment, the feeding means is a means for feeding fuel particles to the combustion region through the static bed.

BRIEF DESCRIPTION OF THE DRAWINGS

These and further features and advantages of the present invention will be described with reference to the attached drawings, in which.

DETAILED DESCRIPTION OF THE PREFERRED EMBODIMENT

Figure 1:
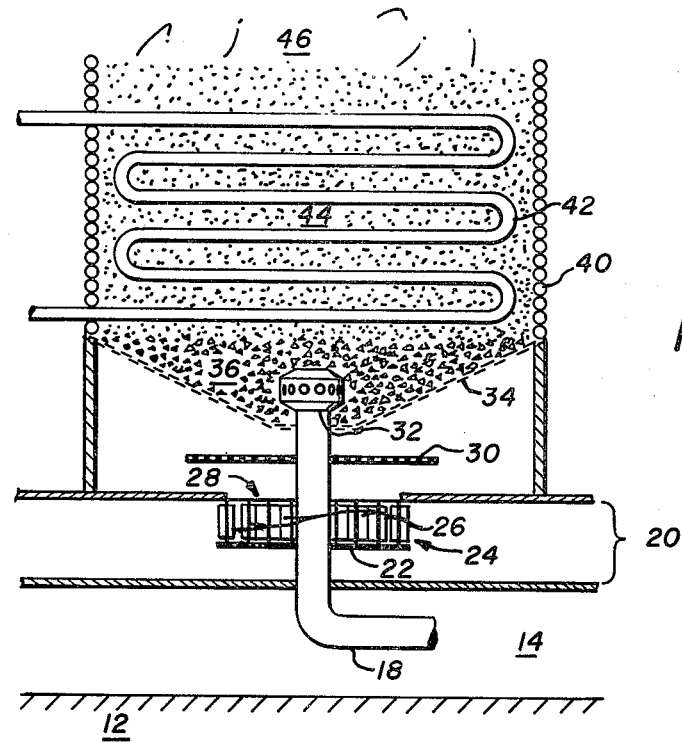
FIG. 1 is a partly sectional vertical elevation of a cell in a fluidized-bed boiler constructed according to the teachings of the present invention.

FIG. 1 shows a single cell of a fluidized-bed boiler. It is thought beneficial to divide a fluidized-bed boiler into several segments, or cells, for efficient operation and control. Since some designers prefer that bed-level heat-transfer surfaces be provided as water-cooled walls as well as tubes embedded in the fluidizing region, the segmented arrangement has the further advantage that it increases wall, and therefore heat-transfer, area. Thus, though the arrangement in FIG. 1 could in principle be the entire combustion area of a boiler, it would be more typical for it to be a single cell in a multi-cell boiler.

The combustion region is bounded on the sides by horizontal waterwalls 40 and on the bottom by the upper surface of an air duct, or *windbox* 20. The windbox is a horizontal duct that is positioned parallel to the floor 12 of the structure, the space between the windbox 20 and the floor 12 defining an access space 14. A static-bed support 34 is positioned above the windbox 20 and extends across the entire area of the cell. It is somewhat dish-shaped, being deeper in the center than on the sides, and it contains inert heat-storage particles, such as heavy ores, in a static-bed region 36. The static-bed support 34 has appropriate openings for allowing air, but not heat-storage particles, to pass through it.

Above and immediately adjacent to the static bed is a fluidizing region 44, which is shown in the drawing as being occupied by a fluidized mass of particles. This suggests the normal operation of the bed, in which the fluidization creates a quasi-liquid mass having a more or less definite upper boundary above which the so-called *freeboard* region 46 extends. The freeboard region, whose purpose is to provide a region in which particles thrown from the bed can execute a complete trajectory and fall back into the bed without being drawn out with the exhaust gases, is not shown surrounded by a waterwall. This is because the cell shown in FIG. 1 is merely one segment of a larger boiler, and it may be permissible for particles thrown from the bed to be returned to an adjacent bed. Of course, the waterwalls could be extended up to enclose the freeboard region.

A coal pipe 18 is led horizontally along the access space 14 and bent upward to proceed vertically, penetrating the windbox 20 and extending up into the static bed 36, terminating in a coal distributor 32 that houses an ignitor and is located in the static bed. The upper surface of the windbox 20 has a circular opening 28 concentric with the coal pipe 18. A damper 24, whose purpose is to regulate the flow of air from the interior of windbox 20 through the opening 28, is positioned in opening 28. The damper 24 has a lower plate 22 that prevents air from entering the damper 24 from the bottom. The damper also includes blades 26 that are adjustable for controlling the amount of air admitted to the damper 24 and through the opening 28. Between the opening 28 and the static bed support 34 is provided a baffle plate 30, which is also concentric with the pipe 18. Since the function of the baffle plate 30 is to distribute properly the air entering through the opening 28, it is appropriately shaped or perforated for this purpose.

Figure 2:
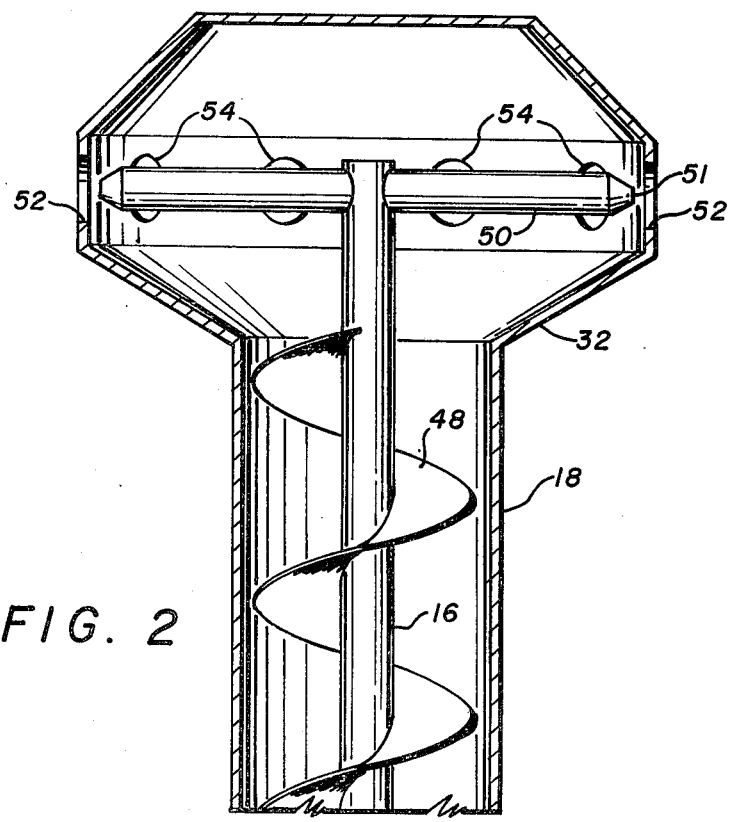
FIG. 2 is a more detailed vertical section of the ignitor housing and part of the coal pipe shown in FIG. 1.

The coal pipe 18 and the distributor 32 are shown in more detail in FIG. 2. A section of the coal pipe 18 and the distributor 32 and a vertical elevation of the gas pipes 16 and 50 and the helical swirl plate 48 are displayed. The first gas pipe 16 is positioned interior to and concentric with the coal pipe 18, and a helical swirl plate 48 is coiled around it. A second gas pipe 50 is positioned horizontally in the interior of the ignitor housing 32, and it communicates with the vertical gas pipe 16 to allow gas to flow from the vertical pipe 16 to the horizontal pipe 50. Though only one horizontal pipe 50 is shown in the drawing, it would be typical for a second horizontal pipe, also in communication with the vertical pipe 16, to be provided at right angles with the horizontal pipe shown. The second horizontal pipe would also have holes in both ends similar to the openings 51 that occupy either end of the horizontal gas pipe 50. The openings 51 are positioned in registration with coal-distribution holes 52, which, along with other holes 54, are spaced around the circumference of the distributor 32.

Though pipes 16 and 50 have been referred to as gas pipes, any other suitable ignitor fuel could be supplied through these pipes. Ignitor fuel entering through these pipes is sprayed out of the distributor 32 through the holes 52 that register with the openings 51 and the horizontal gas pipe 50. This ignitor fuel is lighted by any appropriate means to create a flame whose purpose is to ignite coal supplied through the coal pipe 18. As an inspection of the apparatus will reveal, a coal-air mixture entering through the coal pipe 18 will be caused to follow a helical path by the helical swirl plate 48, and centrifugal force will cause the coal to be propelled out of the distributor through holes 52 and 54.

Operation of the fluidized bed is initiated by feeding ignitor fuel through gas pipes 16 and 50. The ignitor fuel is lighted at the openings 51 by appropriate means not shown in the drawings, and the resulting combustion begins to heat the particles in the static bed 36. To a lesser extent, the heat-transfer surfaces 40 and 42 and the particles in the remainder of the combustion area are also heated. After the static bed has reached a temperature that is high enough to support ignition of the coal, coal feed is initiated through the coal pipe 18, which conducts it to the interior of the ignitor housing 32. Centrifugal force resulting from the helical path that the coal is forced to take propels it out of openings 52 and 54, sending it through the space between the particles in the static bed 36 and distributing it evenly over the cell area. As the coal leaves the ignitor housing 32, it is ignited by the gas flame or by heat from coal already burning in the static inert-particle bed 36. Much of the fuel is blown into the fluidized-bed region 44, but this fuel is not fluidized at first, because the air-flow rate is initially relatively low.

The coal feed is gradually increased to full capacity, and since the combustion is self-sustaining, the flow of auxiliary fuel is discontinued. This mode is maintained until the bed temperature reaches, say, 1500° F. When this temperature is reached, steady-state operation is begun by opening the damper 24 far enough to permit a fluidizing flow of air and turning down the coal feed to the desired rate.

During this normal mode of operation, the characteristic feature of the fluidized bed, its high thermal conductivity, manifests itself, so a small imbalance between heat liberation and heat absorption in the bed can cause a significant change in bed temperature. As the firing rate is lowered in response to changes in load, the normal temperature in the bed is reduced, so a significant temperature drop could well result in a bed temperature that is below the ignition point of the fuel. It is under such conditions that the advantages of the bed constructed according to the teachings of the present invention become apparent.

In prior art designs, if an imbalance between heat liberation and absorption were great enough to reduce the temperature in the fluidized bed to below that required for ignition, the bed would be extinguished and the load dropped. In a boiler built according to the present invention, the imbalance may well act to reduce the fluidized-bed temperature to below the ignition point, but the lower thermal conductivity of the static bed would enable the temperature of the static bed to remain above that required for ignition until restoration of the proper heat-flow balance. As a result, fuel flowing to the fluidized-bed region 44 is ignited by the high temperature in the static-bed region 36, so the bed is rekindled and bed operation continues. The use of fluidized-bed boilers constructed with cells built according to teachings of the present invention can therefore afford reliable fluidized-bed operation even at relatively low loads.

What is claimed is:

1. A fluidized-bed cell, comprising:
   a. a combustion region;
   b. a static ignition bed, positioned in the combustion region, comprising inert heat-storage particles;
   c. a fluidizing region, positioned in the combustion region above and immediately adjacent to the static ignition bed;
   d. means for feeding fuel particles into the static ignition bed;
   e. means for blowing air up thru the static ignition bed into the fluidizing region in such a manner as to fluidize the fuel particles but not the inert heat-storage particles, thereby establishing a fluidized bed of coal particles in the fluidizing region; and
   f. means for igniting fuel particles supplied to the static ignition bed.

2. A cell as recited in claim 1, wherein the static ignition bed comprises a dish-shaped static-bed support plate that contains the inert heat-storage particles and is perforated to form holes that are shaped to permit air but not the inert heat-storage particles to pass through them, the support plate being oriented transverse to the flow of air from the blowing means for passage of the air through the holes in the support, and the inert heat-storage particles having a fluidization velocity greater than that of the fuel particles supplied to the fuel-feeding means, fluidization of the fuel particles by air from the blowing means without fluidization of the inert heat-storage particles thereby being possible.

3. A method of performing fluidized-bed combustion of fuel particles in a combustion region, comprising the steps of:
   a. providing a static ignition bed of inert heat-storage particles in the combustion region;
   b. feeding fuel particles into the static ignition bed of inert heat-storage particles;
   c. establishing a fluidized bed of fuel particles in the combustion region above and immediately adjacent to the static ignition bed; and
   d. igniting the fuel particles supplied to the static ignition bed.

4. A method as recited in claim 3, wherein the step of establishing a fluidized bed of fuel particles in the combustion region above and immediately adjacent to the static ignition bed of inert heat-storage particles comprises blowing air up thru the static ignition bed of inert heat storage particles in such a manner as to fluidize the fuel particles and carry the fuel particles upwards out of the static ignition bed without fluidizing the heat-storage particles.

5. A method for starting fluidized-bed combustion in a fluidized bed having a combustion region having a static ignition bed of inert heat-storage particles and a fluidizing region above and immediately adjacent to the static ignition bed for establishing therein a fluidized bed of fuel particles, comprising the steps of:
   a. providing an ignition flame in the static ignition bed that provides enough heat to raise the static-bed temperature above the ignition temperature of the fuel particles;
   b. blowing air up thru the static ignition bed into the fluidizing region at a velocity below that required for fluidization of the fuel particles;
   c. feeding fuel to the static ignition bed, the fuel thereby being burned in the static ignition bed, the fuel being fed at such a rate as to liberate enough heat to raise the temperature of the static ignition bed to a predetermined temperature above 1500° F. (820° C.); and
   d. raising the air flow to a velocity above the fluidization velocity of the fuel particles but below the fluidization velocity of the inert heat-storage particles, thereby establishing a fluidized bed of fuel particles in the fluidizing region.

* * * * *